United States Patent [19]

Recher et al.

[11] Patent Number: 4,997,506

[45] Date of Patent: Mar. 5, 1991

[54] PROCESS OF DECORATING ARTICLES

[75] Inventors: Gilles Recher; Jean-Pierre Nurit, both of Annecy, France

[73] Assignee: Salomon S.A., Annecy, France

[21] Appl. No.: 249,773

[22] Filed: Sep. 26, 1988

[30] Foreign Application Priority Data

Sep. 25, 1987 [FR] France ................................ 8713553

[51] Int. Cl.[5] ............................ B32B 1/00; D06P 1/00

[52] U.S. Cl. ........................................ 156/235; 8/468; 8/471; 428/203; 428/913.3

[58] Field of Search ............... 156/230, 234, 235, 240, 156/241, 249, 277, 311, 90, 145, 247, 298; 8/467, 468, 471; 427/149, 255.1, 255.6; 428/203, 204, 913.3, 918

[56] References Cited

U.S. PATENT DOCUMENTS

| | | | |
|---|---|---|---|
| 3,952,131 | 8/1976 | Sideman | 156/230 |
| 4,173,672 | 11/1979 | Mannheim | 156/235 |
| 4,175,151 | 11/1979 | Eppich et al. | 427/149 |
| 4,395,263 | 7/1983 | Davis | 8/471 |
| 4,685,984 | 8/1987 | Powers et al. | 156/235 |

FOREIGN PATENT DOCUMENTS

| | | |
|---|---|---|
| 1944905 | 5/1971 | Fed. Rep. of Germany . |
| 2387793 | 11/1978 | France . |
| 2457777 | 12/1980 | France . |
| 2000730 | 1/1977 | United Kingdom . |

*Primary Examiner*—Michael W. Ball
*Assistant Examiner*—Louis Falasco
*Attorney, Agent, or Firm*—Sandler, Greenblum & Bernstein

[57] ABSTRACT

Process of decorating an article having a substantially transparent surface portion, wherein a decorative design formed of sublimable coloring agents contained on a support is transferred into an opaque monolayer contrast sheet. The opaque monolayer contrast sheet is adhered to the surface portion to form a surface portion/contrast sheet complex having a joint therebetween. This complex is assembled to the remainder of the article to be decorated by applying heat for a period of time sufficient to adhere the complex to the article and to achieve further sublimation and migration of the coloring agents from the opaque monolayer contrast sheet into the joint.

46 Claims, 3 Drawing Sheets

PROCESS OF DECORATING ARTICLES

BACKGROUND OF THE INVENTION

1. Field of the Invention

The present invention relates to a process of decorating articles which have a transparent portion whose compositional material is sensitive to heat, and more particularly, to a process of decorating a ski which is substantially transparent at its sole. Further, the present invention relates to articles produced by such process.

2. Reference to Related Applications

This application contains related subject matter to that disclosed in co-pending application Ser. No. 07/249,771 filed on Sept. 26, 1988.

3. Discussion of Background and Relevant Information

While the description which follows specifically relates to the decoration of a sole of a ski, this description is only a nonlimiting example of the process according to the invention. It is evident that the process of decorating according to the invention could be utilized to decorate any product which has similar technical constraints as the sole of a ski. Specifically, in the case of decorating skis, the technical constraints are due to the fact that the substantially transparent sole is generally composed of polyethylene. The problem with polyethylene is that it is sensitive to heat whereby its structure does not adequately resist temperatures above approximately 150° C. Consequently, the decoration of such objects with a sublimable ink transfer printing process directly onto the front surface of the material is inadvisable because, at a temperature of 150° C., the migration of the inks into the support occurs in an imperfect fashion. In this regard, diffusion of the decoration and presence of coloring agents occurs in a zone that is too close to the exterior surface of the object being decorated. In such a situation, the decorative design formed by the coloring agents is very quickly altered due to its vulnerability to exterior agents which attack the exterior surface. This nonsatisfactory method of printing by sublimation onto the exterior surface of a transparent layer, associated with a layer of contrast material to highlight the decorative design, is described in French Patent 2,387,793.

These disadvantages associated with transfer by sublimation have led to the utilization of silk screen lo printing for the decoration of transparent polyethylene ski soles. This silk screen printing process utilizes a silk support for each color. The design is defined by the zones of the silk support where the pores of the silk have not been obstructed by chemical attack. This process has a number of disadvantages, which disadvantages include the substantial financial costs attributed to the loss of ink; the substantial number of printing rejects; the number of screens necessary for a design composed of several colors; and the relatively long time for printing. Furthermore, variations in esthetic possibilities are substantially limited with silk screen printing.

SUMMARY OF THE INVENTION

It is an object of this invention to decorate articles having a substantially transparent portion. More particularly, it is an object of this invention to decorate skis having a substantially transparent sole.

The present invention achieves these objectives by forming an imprinted opaque monolayer contrast sheet by transferring by sublimation a decorative design composed of sublimable coloring agents contained on a support into a surface of an opaque monolayer contrast sheet having upper and lower surfaces, whereby the coloring agents migrate into the contrast sheet. The other surface of the opaque monolayer contrast sheet is adhered to the substantially transparent surface portion to form a surface portion/contrast sheet complex having a joint between the surface portion and the contrast sheet. The complex is assembled with the remainder of the article to be decorated. The assembling includes the application of heat for a period of time sufficient to adhere the complex to the article and to achieve further sublimation and migration of the coloring agents from the opaque monolayer contrast sheet into the joint, whereby the decorative design is visible through the substantially transparent surface portion.

In a preferred embodiment of the invention, the transferring step is performed for a time, at a temperature and under a pressure so that, at the end of the transferring step, a migration front of the coloring agents substantially extends to, but does not reach, the other surface.

According to one aspect of the invention, the opaque monolayer contrast sheet has a thickness between about 0.1 mm and 0.2 mm, and preferably about 0.1 mm.

According to another aspect of the invention, the opaque monolayer contrast sheet is preferably composed of polyamide pigmented white. Preferably, the pigment is titanium dioxide.

According to still another aspect of the invention, the surface portion can be composed of high molecular weight polyethylene.

In accordance with the present invention, the step of transferring a decorative design contained on a support by sublimation into an opaque monolayer contrast sheet can be performed at a temperature between about 130° C. and 250° C., at a pressure between about 0.3 and 3 bars, and for a time between about 5 and 120 seconds. Preferably, this step of transferring is performed at a temperature of about 170° C., a pressure of about 1 bar, and for a time of about 45 seconds.

Furthermore, the step of assembling the surface portion/contrast sheet complex to the remainder of the article to be decorated can be performed at a temperature between about 130° C. and 160° C., at a pressure between about 5 and 7 bars, and for a time between about 5 and 10 minutes. Preferably, this assembling is performed at a temperature of about 140° C., at a pressure of about 6 bars, and for a time of about 7 minutes.

In another aspect of the invention, the adhering in the step of assembling can be accomplished by cross-linking the complex to the remainder of the article. The cross-linking can be achieved utilizing an epoxy resin. Furthermore, an adhering agent can be utilized to adhere the surface portion to the contrast sheet. This adhering agent can be an organic solvent or a cross-linking agent.

In one preferred aspect of the invention, the joint between the surface portion and the opaque monolayer contrast sheet can be substantially transparent.

In another aspect of the invention, the support of the coloring agents is a paper support.

In another embodiment of the invention, the forming of the imprinted contrast sheet and the adhering of the surface portion with the contrast sheet can be performed in one combined step. Preferably, this combined step can be performed at a temperature between about 170° C. and 250° C., a pressure between about 0.3 and 3 bars, and for a time between about 5 and 30 seconds.

In a preferred embodiment of the invention, the article that is being decorated is a ski, and the surface portion is the sole of the ski. In one specific embodiment of decorating a ski, the ski is decorated by forming an imprinted opaque monolayer contrast sheet by transferring a decorative design composed of sublimable coloring agents contained on a support by sublimation into a surface of an opaque monolayer contrast sheet having upper and lower surfaces, whereby the coloring agents migrate into the contrast sheet. This transferring step is performed for a time, at a temperature and under a pressure so that, at the end of the transferring step, the coloring agents form a migration front that substantially extends to, but does not reach, the other surface. The other surface of the opaque monolayer contrast sheet is adhered to the sole, which is substantially transparent, to form a sole portion/contrast sheet complex having a substantially transparent joint between the sole portion and the contrast sheet. The complex is assembled with the remainder of the ski to be decorated. This assembling includes the application of heat for a period of time sufficient to adhere the complex to the object and to achieve further sublimation and migration of the coloring agents from the opaque monolayer contrast sheet into the substantially transparent joint, whereby the decorative design is visible through the substantially transparent sole portion.

Additionally, it is a further object of the present invention to provide decorated articles, especially skis, produced by the various combinations of processes described above.

BRIEF DESCRIPTION OF THE DRAWINGS

The invention will now be described with reference to the attached drawings given by way of nonlimiting example only, in which.

DESCRIPTION OF PREFERRED EMBODIMENTS

It is an object of the present invention to overcome the disadvantages associated with the prior art process for decorating articles at the location of a substantially transparent surface element or portion whose composition is sensitive to heat. In particular, it is an object of the present invention to overcome the prior art disadvantages associated with the decorating of the sole of a ski.

In one embodiment, the process of decorating of the present invention utilizes a sublimable ink transfer printing process which begins with a decorative design composed of sublimable coloring agents on a support paper, and employs, as a receiving support for the sublimable coloring agents, an opaque monolayer contrast sheet composed of a substantially opaque material and having a given thickness.

In practicing the method of this embodiment, in initial step A, the coloring agents are transferred by sublimation of the base image from the support paper onto the upper surface of the opaque monolayer contrast sheet at a temperature T, under a pressure P, for a time t. Then, in step B, the printed opaque monolayer contrast sheet is adhered to the sole of the ski to form a contrast sheet/sole interface at the lower surface of the opaque monolayer contrast sheet and the upper surface of the sole. Accordingly, an opaque monolayer/sole complex is obtained.

Subsequently, in step C, the complex is assembled by adhering the upper surface of the opaque monolayer contrast sheet with the rest of the ski structure, under a pressure P1, and for a time t1, utilizing a polymer which is fused at a temperature T1. The elevation of temperature necessary to achieve this adhering causes, as a supplemental effect, the sublimation and migration of the coloring agents which compose the image in the opaque monolayer contrast sheet. Accordingly, the migration front or plane containing the image moves until the level of the joint between the sole and the opaque monolayer contrast sheet is reached.

According to one of the preferred characteristics of the invention, the thickness of the opaque monolayer contrast sheet is substantially equal to the distance between the upper surface of the opaque contrast sheet and the migration front of the sublimable coloring agents subsequent to the first sublimation transfer of step A.

According to another embodiment of the invention, steps A and B can be performed simultaneously. Also, as previously indicated, the process according to the invention is being particularly described with reference to the decoration of the bottom of a ski, namely, the transparent sole of a ski. However, this is only a nonlimiting example, and other articles can be decorated by the present process.

Figure 1:
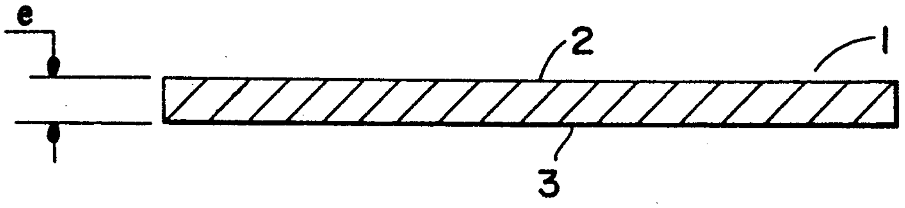
FIG. 1 illustrates a transverse cross-sectional view of the monolayer contrast sheet utilized in the process of the invention.
Figure 4:
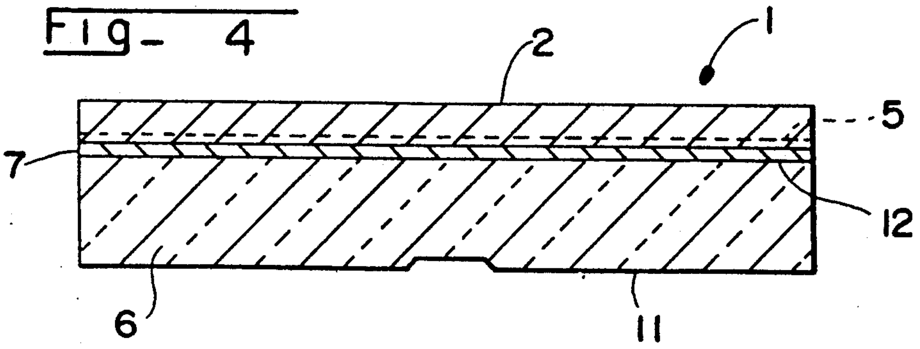
FIG. 4 illustrates a transverse cross-sectional view of the transparent surface element/contrast sheet formed in the second step B of the process according to the invention.
Figure 5:
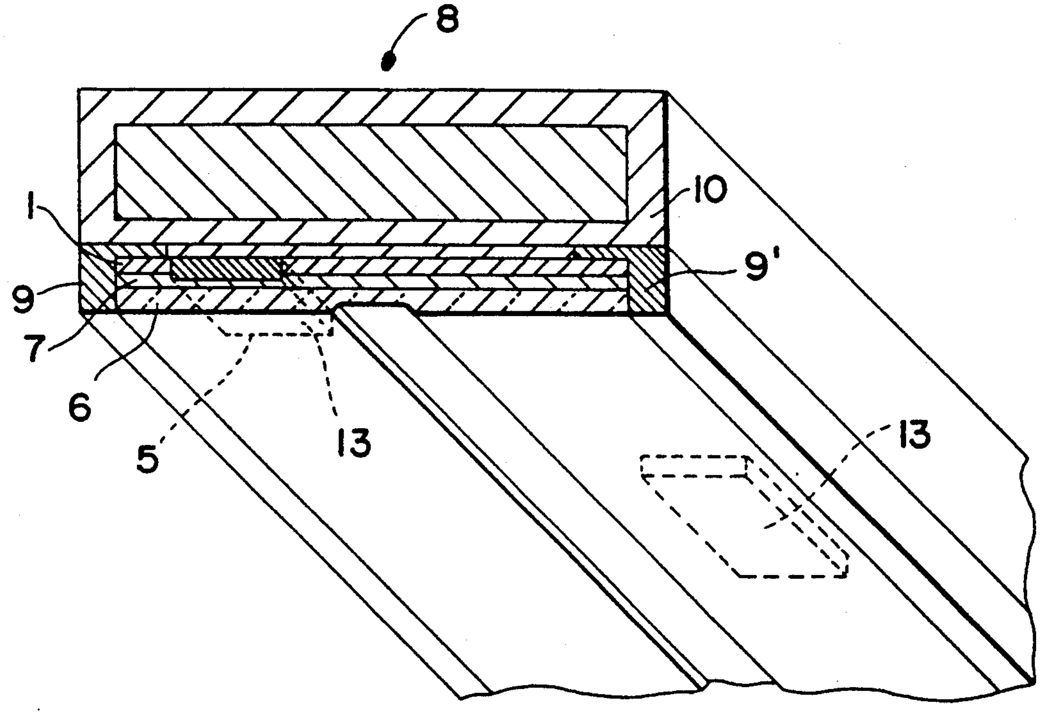
FIG. 5 illustrates a transverse cross-section view extended by a perspective view of the transparent surface element contrast sheet complex attached to the rest of the ski structure of the third step C of the process according to the invention.

The process according to the present invention produces a product which can be described with regard to three separate elements. One of these elements is the substantially transparent element 6 which is to be decorated. As can be seen in FIG. 4, this element 6 has an upper surface 12 and a lower surface 11. The second element, opaque monolayer contrast sheet 1 which is illustrated in FIG. 1, is adapted to form a complex with the surface element 6. The opaque sheet 1 has an upper surface 2 and a lower surface 3. The third element is illustrated in FIG. 5, which shows the remainder of the structure of the ski (8, 9, 9', 10).

In the first step A of the process according to the invention, the opaque monolayer contrast sheet 1 is utilized to receive the coloring agents by sublimation from the paper support sheet 4. While the opaque monolayer contrast sheet 1 is preferably composed of polyamide which is pigmented white with titanium dioxide, the choice of material and pigment can be varied. For example, the opaque monolayer contrast sheet 1 can be composed of polycarbonates, "plexiglass", polyamide derivatives, polyethersulfone, polyesters, etc. Furthermore, the pigmentation of opaque monolayer contrast sheet 1 can be in the form of clear, metallic, or nacreous tints. Of course, it is possible to provide diverse variations of the coloration of the contrast background. Opaque monolayer contrast sheet 1, which has the characteristic of being opaque by virtue of its pigmentation, serves as a contrast background so as to reveal the decorative design in the article. Additionally, opaque monolayer contrast sheet 1 has a thickness "e" which can be between 0.1 and 0.2 mm, preferably equal to about 0.1 mm.

Figure 2:
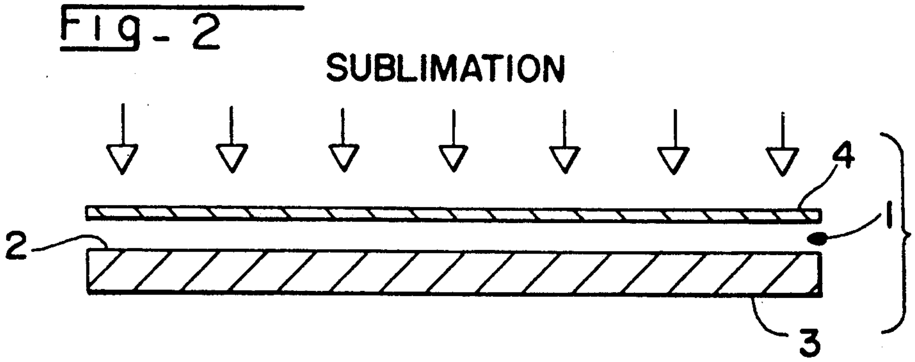
FIG. 2 illustrates the monolayer sheet of FIG. 1 in the course of the first step A of the process according to the invention.
Figure 3:
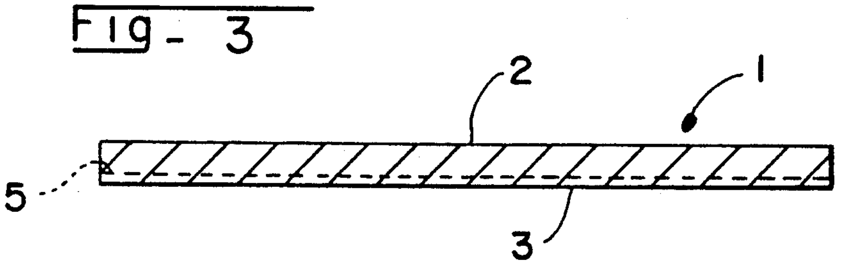
FIG. 3 illustrates the monolayer sheet of FIG. 2 after the first step A of the process according to the invention.

The opaque monolayer contrast sheet 1 serves as a receiver support for the sublimable coloring agents during step A. In this regard, as can be seen in FIG. 2, the first step of the process according to the invention includes printing by transfer of sublimable coloring agents to the upper surface 2 of opaque monolayer contrast sheet 1. This first step is performed by applying a paper support sheet 4, which contains in a known manner the decorative design to be printed, under a pressure P, at a temperature T, and for a time, against the upper surface 2 of opaque sheet 1. According to one of the principal characteristics of the invention, the conditions of the sublimation reaction are selected such that, taking into account the thickness "e" of opaque monolayer contrast sheet 1, the migration front 5 of the sublimable coloring agents goes through a distance substantially equal to the thickness of monolayer contrast sheet 1. In this regard, as can be seen in FIG. 3, migration front 5 of the coloring agents is positioned, after sublimation step A, practically adjacent to the lower surface 3 of the opaque monolayer contrast sheet 1.

According to one preferred embodiment of the invention, for a thickness "e" for opaque monolayer contrast sheet 1 equal to 0.1 mm, the sublimation reaction occurs at a temperature T between about 130° C. and 250° C., preferably 170° C.; a pressure P between about 0.3 and 3 bars, preferably about 1 bar; and for a time t between about 5 and 120 seconds, preferably about 45 seconds. It is emphasized, however, that these values pertain only to the examples selected to illustrate the process according to the invention. In another application, one of ordinary skill in the art would be capable of determining the necessary parameters of temperature, pressure and time.

Preferably, migration front 5 does not extend beyond the lower surface 3 of opaque monolayer contrast sheet 1. If the coloring agents are present on the lower surface 3, they can interact with the adhesive agent utilized in the next step B with a possible alteration of printing quality.

The second step B of the process according to the invention is the adhering operation illustrated in FIG. 4, which was just referred to above. In adhering step B, the upper surface 12 of surface element 6 is contacted with the lower surface 3 of opaque monolayer contrast sheet 1. According to one aspect of the invention, wherein surface element 6 comprises a transparent sole, the sole is composed of polyethylene having a high molecular weight ($2\times10^6-6\times10^6$), which allows it to resist a maximum temperature of 150° C. while retaining its desirable properties. For the sole of a ski, these desirable properties include hardness, resistance to shock, and ability to slide.

The adhering together of the opaque monolayer contrast sheet and surface element 6 can be achieved by any appropriate means. For example, the adhering can be accomplished through the use of an adhesive comprising organic solvents. The only characteristic required for the adhesive agent is that it be transparent.

A problem that can be encountered with known adhering processes is that they can cause the diffusion of the sublimable coloring agents within the material which contains them, thereby altering the decorative design. This disadvantage does not occur in the process according to the present invention because the adhering is a surface phenomenon. Since the lower surface 3 of opaque monolayer contrast sheet 1 does not comprise traces of coloring agent, In this regard, the migration front 5 is above surface 3, with the traces of coloring agents during migration extending from migration front 5 to the upper surface 2. Therefore, the coloring agents in the process of the present invention do not contact the adhesive agent.

In the process according to the present invention, it is preferred to utilize the fusion/cross-linking method for adhering a polymer, without this being considered as a limitation of the invention. Where heat is utilized to adhere the opaque monolayer contrast sheet 1 and the surface element 6, the necessary heat is only applied for a short time beneath the lower surface 3 of the opaque monolayer contrast sheet 1. Consequently, the heat has less of an effect on the coloring agents which form the design that are located above the lower surface 3.

Transparent joint 7, illustrated in a magnified scale in FIG. 4 so as to be more apparent, is the link that establishes a complex of surface element 6 with opaque monolayer contrast sheet 1, referred to as the surface element/contrast sheet complex. Specifically, with regard to the preferred aspect of the invention, the surface element 6 comprises a ski sole.

The third and last step C of the process according to the invention is illustrated in FIG. 5. This step consists of the assembly of the surface element/contrast sheet complex with the remainder of the ski structure. Step C is a combined manufacturing and decorating operation because it simultaneously produces and decorates the ski. This simultaneous production of the ski and decorating of the sole represents a saving in the cost of manufacture of the ski.

The precise structure of ski 8 is not material to the present process of decorating, and accordingly will not be described in detail. Indeed, various possible structures for ski 8 can easily be envisioned. Simply stated the surface element/contrast sheet complex is inserted between edges 9 and 9'. The upper surface 2 of the complex is placed into contact with a structure 10 made of glass fiber, which is conventionally used in the manufacture of skis. The adhesion between the complex and ski 8, more precisely the structure 10 and the edges 9 and 9' is performed by means of an adhering method according to which one fuses at the location of the interface a polymer, for example, an "epoxy" resin which is conventionally utilized in the ski industry. The fusion causes a cross-linking reaction which mutually attaches the two sub-assemblies.

It will be recalled that prior to this operation, the migration front 5 of the coloring agents, which is the visible surface of the decorative design, is positioned just above the lower surface 3 of opaque monolayer contrast sheet 1. Accordingly, the decorative design is not clearly visible across surface element 6. To make the design appear with greater clarity and with a better contrast, it is desirable that the migration front be positioned not in the opaque material, but, at least, in the transparent joint 7.

This desirable result is precisely that which is obtained during the adhering operation for assembly of the ski 8. The following operational conditions are preferably utilized to achieve the adhesion and further migration of the coloring agents. The temperature T1 is between about 130° C. and 160° C., preferably about 140° C.; the pressure P1 is between about 5 and 7 bars, preferably about 6 bars; and the time t1 between about 5 and 10 minutes, preferably about 7 minutes.

During step C, the coloring agents in the solid state which comprise the design sublime again, and migrate into transparent joint 7. The design is then definitely affixed within the transparent joint 7, and visible across surface element 6 with an excellent image quality, which is not altered by parasitic ink diffusions. The final design shown in FIG. 5 carries reference numeral 13.

Migration front 5 of the coloring agents after assembly by cross-linking is shown symbolically in dash lines within transparent joint 7 in FIG. 5.

It is noted that the high molecular weight polyethylene utilized as surface element 6 resists temperatures under 150° C. such that the temperature required for assembly by cross-linking does not affect the physiochemical properties of the sole material. While 150° C. is a preferred temperature, 150° C. is not an optimum value for the sublimation of all coloring agents. In this regard, different coloring agents provide different degrees of migration. For example, blue coloring agents migrate with difficulty. Accordingly, in order to obtain a desired intensity of blue in the final design, it is necessary to have an increased initial concentration of blue coloring agent in the support paper 4. It is obvious that various adjustments of concentration of coloring agents would be required to obtain a final desired design.

Figure 6:
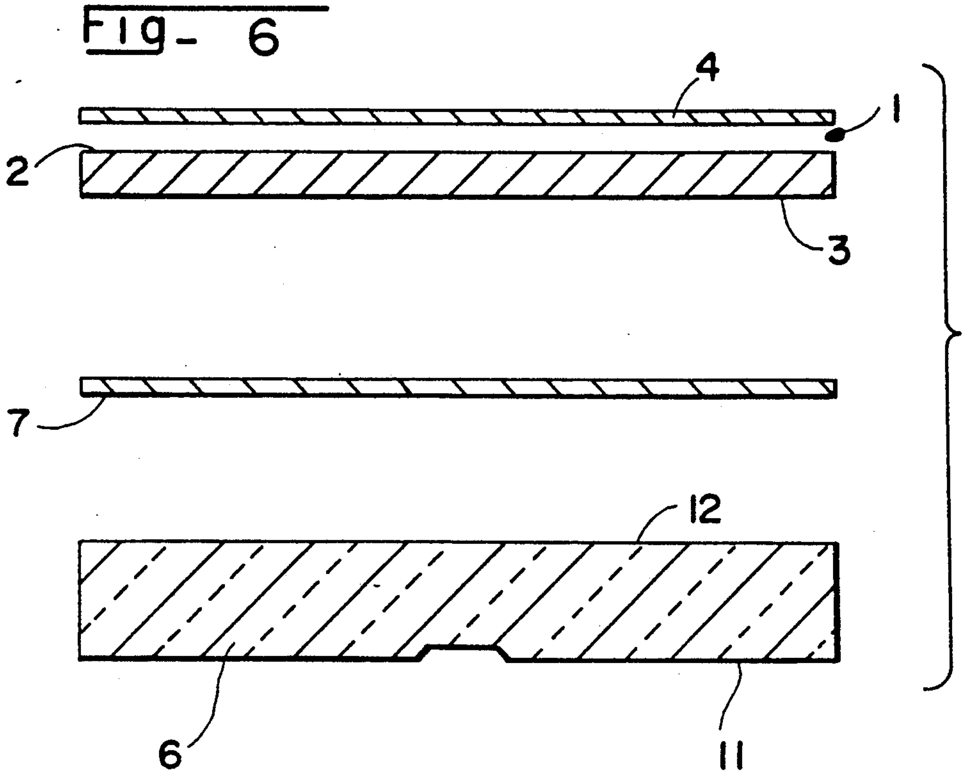
FIGS. 6 and 7 illustrate an alternative embodiment of the process of the invention, wherein steps A and B are performed in one step.
Figure 7:
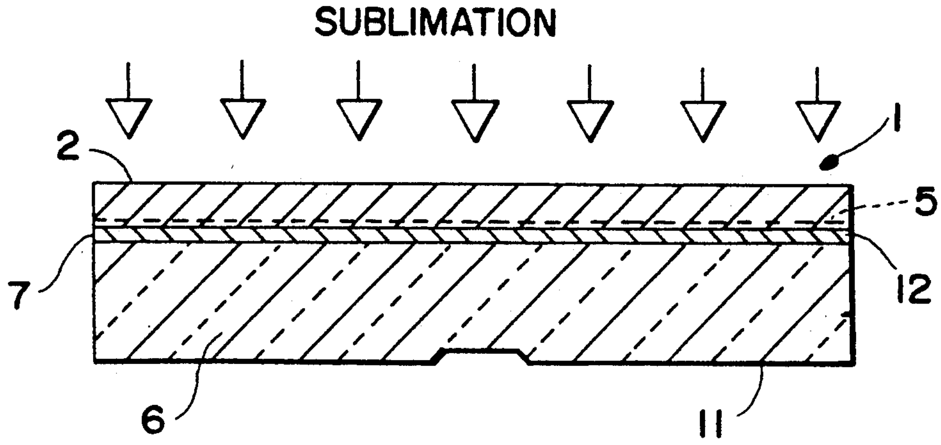

Another embodiment of the present invention is illustrated in FIGS. 6 and 7. This embodiment comprises the combining, into a single step W, printing step A, which includes sublimation of coloring agents into opaque monolayer contrast sheet 1, and step B, which includes adhering opaque monolayer contrast sheet 1 on upper surface 12 of surface element 6.

FIG. 6 illustrates the different elements needed for this embodiment. Specifically, from top to bottom, there are present: the sheet of support paper 4 containing the sublimable coloring agents; the opaque monolayer contrast sheet 1; the adhering film 7; and the surface element 6.

The single step W is illustrated in FIG. 7, wherein the elements depicted in FIG. 6 are shown in an interacting relationship to simultaneously achieve printing by transfer (step A of the preceding embodiment), and adhering (step B of the preceding embodiment).

In this embodiment, the values of temperature T2 are between about 170° C. and 250° C., the pressure P2 is between about 0.3 bar and 3 bars, and the duration t2 is between about 5 seconds and 30 seconds. Accordingly, in single operational step W, a complex formed by surface element 6 and printed opaque monolayer contrast sheet 1 is obtained. This complex contains the decorative design initially contained on the support paper 4. Step C is subsequently performed, as is described for the previous embodiment of the invention and illustrated in FIG. 5.

It is noted that step W occurs for a very brief time relative to step A so as not to damage the material of surface element 6. Furthermore, just as for operational step C, the source of heat is not directly applied to the sensitive material of the sole. Accordingly, there is a diminished effect caused by heat.

The process according to the invention is applicable to the decoration of any article in which the nature of the surface material prohibits any recourse to a conventional transfer process by sublimation requiring elevated temperatures. For example, skating rinks made of synthetic material can be decorated with the invention according to the present invention.

Finally, although the invention has been described with reference to particular means, materials, and embodiments, it is to be understood that the invention is not limited to the particulars disclosed and extends to all equivalents within the scope of the claims.

We claim:

1. A process of decorating an article comprising a surface element which is substantially transparent, wherein:

the process utilizes a printing method which transfers sublimable inks from a decorative design composed of sublimable coloring agents on a paper support; and employs, as a support-receiver of the sublimable coloring agents, a monolayer contrast sheet composed of a substantially opaque material comprising two surfaces;

the process comprising the steps of:

(A) performing transfer by sublimation of a base image on to a first surface of the opaque monolayer contrast sheet;

(B) assembling by adhering the opaque monolayer sheet with a surface of the article to be decorated to obtain a surface element/imprinted opaque monolayer complex; and (C) assembling the surface element/imprinted opaque complex by means of its first upper surface with the article to be decorated by adhering with heat, the adhering heat having a supplemental purpose of causing sublimation and migration of the coloring agents which compose the base image in the opaque monolayer contrast sheet, such that a migration front or plane containing the image moves to a joint between the surface element and the opaque monolayer contrast sheet.

2. Process according to claim 1 characterized in that the operational steps A and B are performed simultaneously in a single step W.

3. Process according to claim 2 characterized in that for operational step W:

temperature T is between about 170° C. and 250° C.;

pressure P is between about 0.3 and 3 bars;

time t is between about five seconds and thirty seconds.

4. Process according to claim 1 characterized in that the thickness of the opaque monolayer contrast sheet is substantially equal to the distance between the upper surface of opaque monolayer contrast sheet and migration front of the sublimable coloring agents after their transfer by sublimination.

5. Process according to claim 1 characterized in that the thickness of the opaque contrast monolayer sheet is between about 0.1 mm and 0.2 mm.

6. Process according to claim 1 characterized in that the material composing the opaque contrast monolayer sheet is polyamide pigmented in white.

7. Process according to claim 1 characterized in that the material constituting the transparent surface element is sensitive to heat and is high molecular weight polyethylene.

8. Process according to claim 1 characterized in that in step A:

temperature T is between about 130° C. and 250° C.;
pressure P is between about 0.3 and 3 bars;
time t is between about 5 seconds and 120 seconds.

9. Process according to claim 1 characterized in that in step C:

temperature T1 is between about 130° C. and 160° C.;
pressure P1 is between about 5 and 7 bars;
time t1 is between about 5 and 10 minutes.

10. Process according to claim 1 characterized in that the joint is constituted by a substantially transparent material.

11. A process of decorating an article having a substantially transparent surface portion, which is separate from a remainder of the article, comprising the steps of:

forming an imprinted opaque monolayer contrast sheet by transferring by sublimation a decorative design composed of sublimable coloring agents contained on a support into a surface of an opaque monolayer contrast sheet having upper and lower surfaces, whereby the coloring agents migrate into the contrast sheet, adhering the other surface of the opaque monolayer contrast sheet to the substantially transparent surface portion to form a surface portion/contrast sheet complex having a joint between the substantially transparent surface portion and the contrast sheet; and assembling the surface portion/contrast sheet complex with the remainder of the article to be decorated, said assembling including heating for a period of time sufficient to adhere the complex to the article and to achieve further sublimation and migration of the coloring agents from the opaque monolayer contrast sheet into the joint, whereby the decorative design is visible through the substantially transparent surface portion.

12. The process of decorating according to claim 11, wherein the transferring step is performed for a time, at a temperature and under a pressure so that, at the end of the transferring step, the coloring agents form a migration front that substantially extends to, but does not reach, the other surface.

13. The process of decorating according to claim 12, wherein the opaque monolayer contrast sheet has a thickness between about 0.1 mm and 0.2 mm.

14. The process of decorating according to claim 13, wherein the opaque monolayer contrast sheet has a thickness of about 0.1 mm.

15. The process of decorating according to claim 13, wherein the opaque monolayer contrast sheet is composed of polyamide pigmented white.

16. The process of decorating according to claim 15, wherein the polyamide is pigmented with titanium dioxide.

17. The process of decorating according to claim 11, wherein the surface portion is composed of high molecular weight, polyethylene.

18. The process of decorating according to claim 12, wherein the surface portion is composed of high molecular weight-polyethylene.

19. The process of decorating according to claim 16, wherein the surface portion is composed of high molecular weight polyethylene.

20. The process of decorating according to claim 12, wherein the step of transferring is performed at a temperature between about 130° C. and 250° C., at a pressure between about 0.3 and 3 bars, and for a time between about 5 and 120 seconds.

21. The process of decorating according to claim 15, wherein the step of transferring is performed at a temperature between about 130° C. and 250° C., at a pressure between about 0.3 and 3 bars, and for a time between about 5 and 120 seconds.

22. The process of decorating according to claim 18, wherein the step of transferring is performed at a temperature between about 130° C. and 250° C., at a pressure between about 0.3 and 3 bars, and for a time between about 5 and 120 seconds.

23. The process of decorating according to claim 20, wherein the step of transferring is performed at a temperature of about 170° C., a pressure of about 1 bar, and for a time of about 45 seconds.

24. The process of decorating according to claim 21, wherein the step of transferring is performed at a temperature of about 170° C., a pressure of about 1 bar, and for a time of about 45 seconds.

25. The process of decorating according to claim 22, wherein the step of transferring is performed at a temperature of about 170° C., a pressure of about 1 bar, and for a time of about 45 seconds.

26. The process of decorating according to claim 11, wherein the adhering in the step of assembling comprises cross-linking the complex to the remainder of the article.

27. The process of decorating according to claim 26, wherein an epoxy resin is utilized to adhere the complex to the remainder of the article.

28. The process of decorating according to claim 12, wherein the step of assembling is performed at a temperature between about 130° C. and 160° C., at a pressure between about 5 and 7 bars, and for a time between about 5 and 10 minutes.

29. The process of decorating according to claim 15, wherein the step of assembling is performed at a temperature between about 130° C. and 160° C., at a pressure between about 5 and 7 bars, and for a time between about 5 and 10 minutes.

30. The process of decorating according to claim 18, wherein the step of assembling is performed at a temperature between about 130° C. and 160° C., at a pressure between about 5 and 7 bars, and for a time between about 5 and 10 minutes.

31. The process of decorating according to claim 26, wherein the step of assembling is performed at a temperature between about 130° C. and 160° C., at a pressure between about 5 and 7 bars, and for a time between about 5 and 10 minutes.

32. The process of decorating according to claim 28, wherein the step of assembling is performed at a temperature of about 140° C., at a pressure of about 6 bars, and for a time of about 7 minutes.

33. The process of decorating according to claim 29, wherein the step of assembling is performed at a temperature of about 140° C., at a pressure between about 6 bars, and for a time of about 7 minutes.

34. The process of decorating according to claim 30, wherein the step of assembling is performed at a temperature of about 140° C., at a pressure of about 6 bars, and for a time of about 7 minutes.

35. The process of decorating according to claim 31, wherein the step of assembling is performed at a temperature of about 140° C., at a pressure of about 6 bars, and for a time of about 7 minutes.

36. The process of decorating according to claim 12, wherein, the joint is substantially transparent.

37. The process of decorating according to claim 36, wherein an adhering agent is utilized to adhere the surface portion to the contrast sheet.

38. The process of decorating according to claim 37, wherein the adhering agent comprises an organic solvent.

39. The process of decorating according to claim 37, wherein the adhering agent crosslinks the surface portion to the contrast sheet.

40. The process of decorating according to claim 11, wherein the forming of the imprinted contrast sheet and the adhering of the surface portion with the contrast sheet is performed in one combined step.

41. The process of decorating according to claim 12, wherein the forming of the imprinted contrast sheet and the adhering of the surface portion with the contrast sheet is performed in one combined step.

42. The process of decorating according to claim 40, wherein the combined step is performed at a temperature between about 170° C. and 250° C., a pressure between about 0.3 and 3 bars, and for a time between about 5 and 30 seconds.

43. The process of decorating according to claim 41, wherein the combined step is performed at a temperature between about 170° C. and 250° C., a pressure between about 0.3 and 3 bars, and for a time between about 3 and 30 seconds.

44. The process of decorating according to claim 11, wherein the support is a paper support.

45. The process of decorating according to claim 11, wherein the article is a ski, and the surface portion is the sole of the ski.

46. A process of decorating a ski having a substantially transparent sole portion, which is separate from a remainder of the ski during manufacture of the ski, comprising the steps of:

forming an imprinted opaque monolayer contrast sheet by transferring by sublimation a decorative design composed of sublimable coloring agents contained on a support into a surface of an opaque monolayer contrast sheet having upper and lower surfaces, whereby the coloring agents migrate into the contrast sheet, the transferring step is performed for a time, at a temperature and under a pressure whereby, after the transferring by sublimation, the coloring agents from a migration front that substantially extends to, but does not reach, the other surface;

adhering the other surface of the opaque monolayer contrast sheet to the substantially transparent sole portion to form a sole portion/contrast sheet complex having a substantially transparent joint between the sole portion and the contrast sheet; and assembling the sole portion/contrast sheet complex with the remainder of the ski to be decorated, said assembling including heating for a period of time sufficient to adhere the complex to the object and to achieve further sublimation and migration of the coloring agents from the opaque monolayer contrast sheet into the substantially transparent joint, whereby the decorative design is visible through the substantially transparent sole portion.

* * * * *